United States Patent Office 3,009,913
Patented Nov. 21, 1961

3,009,913
PIGMENTS OF THE DIOXAZINE SERIES
André Pugin, Basel, and Emil Stocker, Riehen, near Basel, Switzerland, assignors to J. R. Geigy A.-G., Basel, Switzerland
No Drawing. Filed May 2, 1958, Ser. No. 732,447
Claims priority, application Switzerland May 10, 1957
9 Claims. (Cl. 260—246)

The present invention concerns new pigments of the dioxazine series, a process for the production thereof as well as the use of these new dyestuffs for pigmenting organic materials of various origin.

Triphendioxazine dyestuffs which are substituted in the benzenoid nuclei by acylated amino groups and which are insoluble in water are already known and have already been suggested as pigment dyestuffs. These compounds are produced by condensing chloranil with those amino-aryl compounds which in addition to a primary amino group also contain as substituent at least one acylated amino group or an amino group which can be acylated whereupon the oxazine ring is formed and the condensation product is acylated if necessary. As such triphendioxazine dyestuffs only those are known which are not substituted in the o-positions to the acylamino groups or only contain alkyl groups as substituents. Polymeric thermoplastic substances, for example polyvinyl chloride, pigmented with such bis-acylaminotriphendioxazine dyestuffs often have insufficient fastness to migration. This is seen for example when the coloured foils come into contact with uncoloured lacquers and foils of synthetic materials by the colouring thereof.

It has now been found that dioxazine dyestuffs having very good fastness to light and which are particularly fast to migration and cross lacquering are obtained if chloranil is condensed with amines having no sulphonic acid and carboxylic acid groups, of the general formula:

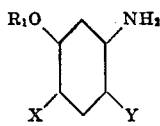
I in which X represents an acylamino group, the acyl radical of which is derived from a carboxylic acid, and Y represents hydrogen or $OR_2$; and $R_1$ and $R_2$ each represent an alkyl or aralkyl group, and either simultaneously or subsequently forming the oxazine ring in the condensation products obtained.

The dioxazine dyestuffs produced according to the present invention correspond to the general formula

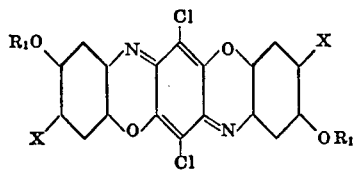
II wherein the symbols $R_1$ and X have the meanings given above. From what has been said above, it can be seen that the new dyestuffs have noticeably better fastness to migration and cross lacquering than the known bis-acyl-amino-triphendioxazine pigments.

In particular the radicals of aliphatic, araliphatic, aromatic and heterocyclic monocarboxylic acids as well as carbonic acid half ester radicals and carbamic acid radicals are used as carboxylic acid radicals of the acylamino groups. Acylamino groups derived from dicarboxylic acids however can also be present, but only those in which the nitrogen atom is bound in a ring with two carbonyl groups such as, for example, in the phthaloyl or succinyl amino groups. In the substituent $Y=-OR_2$ in primary amines of the general Formula I, the symbol $R_2$ represents for example a low molecular alkyl group, in particular a methyl group. Examples of arylamines of the general Formula I used according to the present invention are as follows:

4-amino-2.5-dimethoxy-1-acetylamino-benzene,
4-amino-2.5-dibenzyloxy-1-acetylamino-benzene,
·1-amino-2.5-dimethoxy-1-acetoacetylamino-benzene,
4-amino-2.5-dimethoxy-1-α-hydroxy-propionyl amino-benzene,
4-amino-2.5-dimethoxy-1-n-butyrylamino-benzene,
4-amino-2.5-dimethoxy-1-carbomethoxyamino-benzene,
4-amino-2.5-dimethoxy-1-carbethoxyamino-benzene,
4-amino-2.5-dimethoxy-1-carbo-β-methoxyethoxyamino-benzene,
4-amino-2.5-dimethoxy-1-cinnamoylamino-benzene,
4-amino-2.5-dimethoxy-1-phenacetylamino-benzene,
4-amino-2.5-dimethoxy-1-phenoxyacetylamino-benzene,
4-amino-2.5-dimethoxy-1-benzoylamino-benzene,
4-amino-2.5-diethoxy-1-benzoylamino-benzene,
4-amino-2.5-dibenzyloxy-1-benzoylamino-benzene,
4-amino-2.5-dimethoxy-1-(2'-chlorobenzoylamino)-benzene, and the corresponding 2.5-diethoxy derivative,
4-amino-2.5-di-n-butoxy-1-(2'-chlorobenzoylamino)-benzene,
4-amino-2.5-bis-(2'-chlorobenzyloxy)-1-(2''-chlorobenzoylamino)-benzene,
4-amino-2.5-dimethoxy-1-(3'-chlorobenzoylamino)-benzene,
4-amino-2.5-dimethoxy-1-(4'-chlorobenzoylamino)-benzene,
4-amino-2.5-diethoxy-1-(4'-chlorobenzoylamino)-benzene,
4-amino-2.5-dibenzyloxy-1-(4'-chlorobenzoylamino)-benzene,
4-amino-2.5-dimethoxy-1-(2'.4'-dichlorobenzoylamino)-benzene,
4-amino-2.5-dimethoxy-1-(3'.4'-dimethylbenzoylamino)-benzene,
4-amino-2.5.4'-trimethoxy-1-benzoylamino-benzene,
4-amino-2.5-dimethoxy-1-(4'-dimethylsulphamido-benzoylamino)-benzene,
4-amino-2.5-dimethoxy-1-(2'-chlorobenzoyl-N-methyl-amino)-benzene,
4-amino-2.5-dimethoxy-1-(4'-chlorobenzoyl-N-methyl-amino)-benzene,
4-amino-2.5-dimethoxy-1-(2'-chlorobenzoyl-N-benzyl-amino)-benzene,
4-amino-2.5-dimethoxy-1-(acetyl-N-benzylamino)-benzene,
4-amino-2.5-dimethoxy-1-(3'.4'-dichlorophenyl-carbaminylamino)-benzene,
4-amino-2.5-dimethoxy-1-phthalimido-benzene, 4-amino-2.5-dimethoxy-1-α-furoylamino-benzene and
4-amino-2.5-dimethoxy-4-γ-pyridoylamino-benzene.

Such arylamines can be produced for example from 2-aminohydroquinone ethers by acylation, nitration and reduction or from 2-nitro-5-aminohydroquinone ethers by acylation and reduction. Some of the compounds are already known as intermediate products in the dyestuff industry.

Most valuable dyestuffs are obtained with those arylamines of the general Formula I in which the acylamino group is a possibly substituted benzoylamino group. In view of the fastness to migration of the dyestuffs produced therewith, of these dyestuffs the best results are obtained with those benzoylamino compounds which contain a substituent such as an alkoxy group or a halogen atom in the p-position to the carbonyl group in the benzene nucleus. If such a substituent is in the o-position to the carbonyl group, then remarkably fast to light dyestuffs are obtained.

Compounds of the Formula I in which X represents a chloro-substituted benzoylamino group and $R_1$ a lower alkyl radical, are particularly valuable dyestuffs.

The methods both for the condensation of the chloranil with the arylamines of the general Formula I and for closing the dioxazine ring are known per se. The chloranil condensation is performed advantageously in an inert organic solvent in the presence of an acid binding agent and at room temperature or while slightly heating. It is performed for example in diluted ethyl alcohol at the boil using sodium acetate as acid binding agent. The oxazine ring is then formed in the 2.5-di-p-acylamino-phenylamino) - 3.6-dichloro - 1.4 - benzoquinones so obtained, generally at a raised temperature. For this purpose, the condensation products are brought to a temperature of 130–250°, the reaction being performed advantageously in inert high boiling organic solvents. To accelerate the ring closure, it is of advantage to add acids or compounds which split acids. If in the condensation with chloranil, such arylamines are used which have no substituent in the p-position to the ether group present as defined, that is those in which the symbol Y in the general Formula I is a hydrogen atom, then an oxidising agent is added to the reaction mixture provided that neither the solvent nor the acid or compound which splits acid can act as such. The ring is closed in the 2.5-di-(p-acylamino-phenylamino)-3.6-dichloro-1.4-benzoquinones to form the corresponding dioxazine compounds for example in dichlorobenzene, trichlorobenzene, nitrobenzene, naphthalene or chloronaphthalene, at temperatures of 150–200° and in the presence of carboxylic acid or sulphonic acid halides of the benzene series such as for example benzene or toluene sulphochloride. Instead of carboxylic and sulphonic acid halides, also ω-halogen alkyl compounds such as for example benzotrichloride or also metal chlorides such as aluminium chloride, ferric chloride or zinc chloride can be used to form the oxazine ring.

A simplification of the two-step production process consists in performing the chloranil condensation already in a high boiling inert organic solvent and then closing the oxazine ring without isolating the quinone intermediate product. It is also possible to perform the chloranil condensation and the oxazine ring closure in one and the same solvent at a raised temperature, which procedure reduces the process to one single step. Finally, it should also be noted that, after splitting off acyl radicals, other carboxylic acid radicals can be introduced into the triphendioxazine dyestuffs according to the present invention which contain acylamino groups which can be saponified. This method is possibly indicated when difficulties due to the nature of the acyl radical occur in the production of arylamines of the general Formula I.

The new dioxazine pigments are isolated from the reaction mixture in the usual way by dilution or concentration of the reaction agents. Often the dyestuffs crystallise almost completely out just on cooling the reaction mixture. They are further purified by filtering and washing the precipitate with acids, bases or organic solvents. They are obtained in the form of pure, deeply coloured crystals by crystallisation from high boiling chlorinated and/or nitrated hydrocarbons.

For industrial purposes, it is of advantage to produce the new pigment dyestuffs in a finely dispersed form. They are treated for this purpose, for example, with acids, for example sulphuric acid, aliphatic or aromatic carboxylic acids or sulphonic acids. Fine distribution can also be attained by milling, inorganic or organic salts which can be removed later with solvents being used as milling additives and possibly neutral, acid- or basic-reacting compounds being used as additional milling additives. Solid or liquid organic solvents are used as the latter. For example, the pigment dyestuffs isolated from the reaction mixture and dried are milled with dehydrated calcium chloride or with sodium sulphate or sodium chloride in the presence of aliphatic or aromatic, possibly chlorinated and/or nitrated hydrocarbons such as cyclohexane, benzene, toluene, naphthalene, mono-, di- or tri-chlorobenzene, tetrachlorethane or nitrobenzene. After milling, the milling agent as well as the milling additives are removed, for example with solvents or the organic milling additives are also possibly removed by distillation. In this way, finely dispersed pigments are obtained which, in addition, are of softer texture and have more colour strength than the untreated pigments.

The pigment dyestuffs according to the present invention can be used for pigmenting varnishes, rubber, lacquers and synthetic materials. The pure blue, bluish-red to dark violet colourings have good fastness to solvents and oil. Mention has already been made of the good to very good fastness to migration as well as of the fastness to light and cross lacquering. The new pigment dyestuffs are also suitable for the colouring of paper and of viscose or cellulose ester material in the mass, of moulding compounds and thermoplastic masses. They can also be used in pigment printing pastes for textiles or paper, as well as for paints. They can also serve for shading phthalocyanine pigments; mixtures with these pigments produce the very desirable fast to light reddish blue shades.

The following examples illustrate the invention without limiting it in any way. Where not otherwise stated, in the examples parts are given as parts by weight and the temperatures are in degrees centigrade. The relationship of parts by weight to parts by volume is as that of grammes to cubic centimetres.

*Example 1*

42 parts of 1-amino-2.5-dimethoxy-4-acetylaminobenzene (M.P. 145–146°), 24.6 parts of chloranil and 27.2 parts of crystallised sodium acetate are boiled under reflux for 10 hours in 500 parts of alcohol while stirring. The precipitate formed is filtered off under suction, washed with alcohol and water and dried. 52 parts of a deeply coloured product are obtained. This primary condensation product is converted into the dioxazine compound by heating in 400 parts of o-dichlorobenzene with 75 parts of benzoyl chloride for 6 hours at 175°. The dioxazine compound is then filtered off under suction at 100° and washed with o-dichlorobenzene, alcohol and acetone. 42 parts of a brown-violet product are obtained which produces a deep violet pigment on finely distributing by milling with sodium sulphate in the presence of small amounts of carbon tetrachloride. With a printing colour produced by grinding this pigment with linseed oil varnish and aluminium hydroxide a violet colouring is obtained on paper which has very good fastness to light. In stoving lacquers it has excellent fastness to cross lacquering and in polyvinyl chloride very good fastness to migration. On milling 1 part of this dioxazine pigment with 1 part of copper phthalocyanine in the presence of 6 parts of dehydrated calcium chloride in a ball mill, after dissolving away the salt a pigment dyestuff mixture having a valuable deep blue shade and very good fastness properties is obtained.

If in the above process, instead of the 1-amino-2.5-dimethoxy-4-acetylaminobenzene, 48 parts of 1-amino-2.5-dimethoxy-4-α-hydroxypropionylaminobenzene (M.P. 124–125°) are used, then a pigment is obtained which produces pure violet prints on paper having similar good properties. The 1-amino-2.5-dimethoxy-4-α-hydroxypropionylaminobenzene can be produced for example by nitration of the condensation product from 1-amino-2.5-dimethoxybenzene and lactic acid and then reducing.

On using 71.2 parts of 1-amino-2.5-dimethoxy-4-(3′.4′-dichlorophenyl-carbaminylamino)-benzene (M.P. about 350°)—produced by condensing 1-amino-2.5-dimethoxybenzene with 3.4-dichlorophenyl isocyanate, nitrating and reducing—a pigment is obtained which produces pure reddish violet shades on paper having very good fastness properties.

Finally, if 45.2 parts of 1-amino-2.5-dimethoxy-4-carbomethoxyaminobenzene (M.P. 119–120°) or 48 parts of 1-amino-2.5 - dimethoxy - 4 - carbethoxyaminobenzene (M.P. 100–101°) are used, then reddish violet pigments are obtained under the same conditions which have very good fastness properties.

*Example 2*

60 parts of 1-amino-2.5-diethoxy-4-benzoylaminobenzene, 24.6 parts of chloranil and 16.4 parts of anhydrous sodium acetate are heated in 500 parts of nitrobenzene for 4 hours at 70–80°. After adding 30 parts of benzene sulphochloride, the temperature is raised to 180° and kept there for 4 hours. The reaction mixture is then filtered at 100° and the precipitate is washed with alcohol, water and acetone. 65 parts of a black-violet powder are obtained with which, after finely distributing, polyvinyl chloride foils can be pigmented in pure blue-violet shades which are fast to migration. If in the above process the 1-amino-2.5-diethoxy-4-benzoylaminobenzene is replaced by 66.7 parts of 1-amino-2.5-diethoxy-4-(4′-chlorobenzoylamino)-benzene or by 66.7 parts of 1-amino-2.5 - diethoxy -4 -(2′- chlorobenzoylamino)- benzene, then even purer and more fast to light pigments are obtained which have very good fastness to migration and cross lacquering. These amines are produced for example by nitrating the condensation product from 1-amino-2.5-dimethoxybenzene and 4-chloro- or 2-chloro-benzoyl chloride and then reducing.

*Example 3*

54.4 parts of 1-amino-2.5-dimethoxy-4-benzoylaminobenzene, 24.6 parts of chloranil and 27.2 parts of crystallised sodium acetate are boiled under reflux in 500 parts of alcohol and 50 parts of water for 8 hours. The precipitate is filtered off hot, washed with alcohol and water and dried. 60 parts of a powder are obtained. This condensation product is converted into the dioxazine compound by heating it in 400 parts of nitrobenzene with 30 parts of benzene sulphochloride for 3 hours at 175°. The crystalline precipitate is filtered off at 100° and washed with alcohol and acetone. 55 parts of a black-violet powder are isolated with which, after finely distributing, polyvinyl chloride foils or stoving lacquers can be pigmented in pure violet shades which have very good fastness to migration and cross lacquering.

If in the above process, instead of 1-amino-2.5-dimethoxy-4-benzoylaminobenzene, 61.2 parts of 1-amino-2.5-dimethoxy-4-(2′-chlorobenzoylamino)-benzene (M.P. 136°) are used, then a pigment is obtained which produces much more blue colourings having very good fastness to light.

With 61.2 parts of 1-amino-2.5-dimethoxy-4-(4′-chlorobenzoylamino)-benzene (M.P. 134–135°) or 68.2 parts of 1-amino-2.5 - dimethoxy - 4 - (2′.4′-dichlorobenzoylamino)-benzene (M.P. 90–91°) a pigment is obtained which in polyvinyl chloride produces deep blue colourings of excellent fastness to migration. Similar results are obtained if 60.4 parts of 1-amino-2.5-dimethoxy-4-(4′-methoxybenzoylamino)-benzene (M.P. 137°) are used as starting product.

*Example 4*

If, in Example 3, the 1-amino-2.5-dimethoxy-4-benzoylaminobenzene is replaced by 56.4 parts of 1-amino-2.5-dimethoxy-4-γ-pyridoylaminobenzene — produced by nitrating and subsequently reducing the condensation product from 1-amino-2.5-dimethoxybenzene and pyridine-4-carboxylic acid chloride—then, after finely distributing, a dioxazine pigment is obtained with which lacquers and polyvinyl chloride foils can be pigmented in reddish violet shades which have good fastness to cross lacquering and migration.

With 52.4 parts of 1-amino-2.5-dimethoxy-4-furoylaminobenzene, produced by nitrating and subsequently reducing the condensation product from 1-amino-2.5-dimethoxybenzene and furoyl chloride, a deep violet dioxazine pigment having similar good properties is obtained.

*Example 5*

If in Example 1, the 1-amino-2.5-dimethoxy-acetylaminobenzene is replaced by 56.8 parts of 1-amino-2.5-dimethoxy-4-phenylacetylaminobenzene (M.P. 60–61°) then, after finely distributing, a dioxazine pigment is obtained which produces red-violet colourings in polyvinyl chloride and lacquers which have good fastness to light, migration and cross lacquering.

With 59.4 parts of 1-amino-2.5-dimethoxy-4-cinnamoylaminobenzene (M.P. 168–170°) a dioxazine pigment is obtained which produces deep violet colourings in the same material which have similar good properties.

In the following table, the shades obtained on paper with the printing colour produced by grinding a dioxazine dyestuff pigment of the general Formula III with linseed oil and aluminium hydroxide are given in column I. The colour of the solution of the dioxazine compound in concentrated sulphuric acid is given in column II and the colour of the solution in boiling nitrobenzene is given in column III.

These dioxazine pigments are produced according to Example 3 and the intermediate products are produced by nitrating and subsequently reducing the condensation product from 1-amino- or 1-alkylamino-2.5-dialkoxybenzene or -diaralkoxybenzene with the corresponding acid chloride.

In the case of 1-amino-2.5-dimethoxy-4-phthalimidobenzene, the 1-amino-2.5-dimethoxy-4-nitrobenzene was condensed with phthalic acid anhydride and the nitro group was catalytically reduced with Raney-nickel.

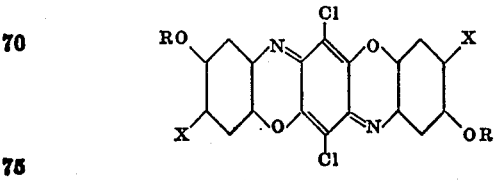

(III)

| No. | R | X | I | II | III |
|---|---|---|---|---|---|
| 1 | —CH₃ | —HN—CO—⬡—Cl (Cl ortho) | violet | reddish black | reddish blue |
| 2 | —CH₃ | —HN—CO—⬡(Cl)—Cl | do | reddish violet | red-violet |
| 3 | —CH₃ | —N(CO)(CO)—⬡ (phthalimido) | cyclamen | violet | bluish red |
| 4 | —CH₃ | —HN—COOCH₂—CH₂—OCH₃ | reddish violet | deep blue | red |
| 5 | —CH₂—⬡ | —HN—CO—CH₃ | violet | do | red-violet |
| 6 | —CH₂—⬡ | —HN—CO—⬡ | reddish violet | do | Do. |
| 7 | —CH₂—⬡—Cl | —HN—CO—⬡—Cl | violet | do | Do. |
| 8 | —CH₃ | —HN—CO—CH₂—O—⬡—Cl | red violet | blue-violet | Do. |
| 9 | n-C₄H₉ | —HN—CO—⬡(Cl) | violet | do | Do. |

*Example 6*

4 parts of the pigment produced according to Example 2 from 1-amino-2.5-diethoxy-4-(2'-chlorobenzoylamino)-benzene are mixed and ground with 36 parts of aluminium hydroxide, 60 parts of linseed oil varnish of medium viscosity and 0.2 part of cobaltous linoleate in a three roll mill. A graphic colour is obtained which produces blue-violet prints of particular purity and colour strength and which also have very good fastness to light.

*Example 7*

10 parts of the pigment produced according to Example 3 from 1-amino-2.5 dimethoxy-4-(2'-chlorobenzoylamino)-benzene are milled for 48 hours in a ball mill with 10 parts of titanium dioxide, 35 parts of a 60% solution of a modified urea-alkyl resin in xylene/butanol 1:1, 10 parts of turpentine and 5 parts of xylene. If this coloured lacquer is poured onto aluminium foils and fixed by stoving for 1 hour at 120°, then deep violet colourings are obtained which have excellent fastness to heat, cross lacquering and light.

*Example 8*

67 parts of polyvinyl chloride, 33 parts of dioctyl phthalate, 2 parts of dibutyl tin dilaureate, 0.6 part of the pigment produced according to Example 3 from 1-amino-2.5-dimethoxy-4-(4'-chlorobenzoyl-amino)-benzene and 2 parts of titanium dioxide are mixed together and passed through a rolling mill for 10–15 minutes at 140°. Deep blue polyvinyl chloride foils are obtained which have very good fastness to migration and light.

What we claim is:

1. A dioxazine pigment which corresponds to the formula which is free from carboxylic and sulphonic acid groups,

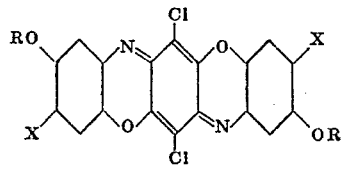

wherein X is a member selected from the group consisting of acetylamino, hydroxypropionylamino, dichlorophenyl - carbaminylamino, carbomethoxyamino, carbethoxyamino, benzoylamino, chlorobenzoylamino, methoxybenzoylamino, pyridoylamino, furoylamino, phenylacetylamino and cinnamoylamino, R represents a member selected from the group consisting of lower alkyl and benzyl.

2. A dioxazine pigment which corresponds to the formula which is free from carboxylic and sulphonic acid groups wherein X is a lower alkanoylamino with a maximum of four carbon atoms, and R is lower alkyl.

3. A dioxazine pigment which corresponds to the formula

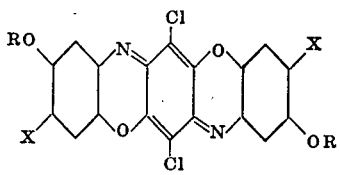

wherein X represents a chlorine substituted benzoylamino radical and R represents a lower alkyl radical.

4. The dioxazine pigment of the formula

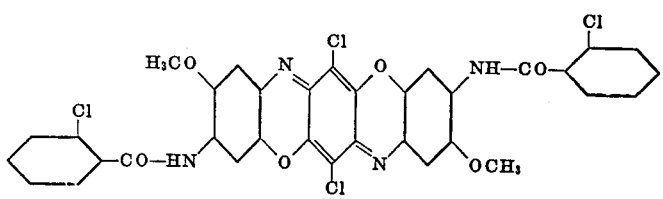

5. The dioxazine pigment of the formula

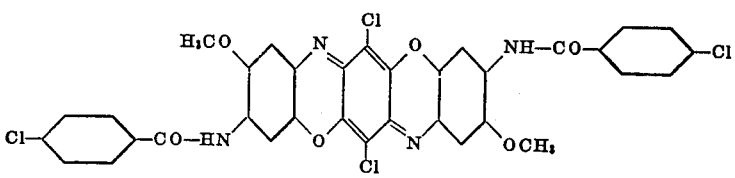

6. The dioxazine pigment of the formula

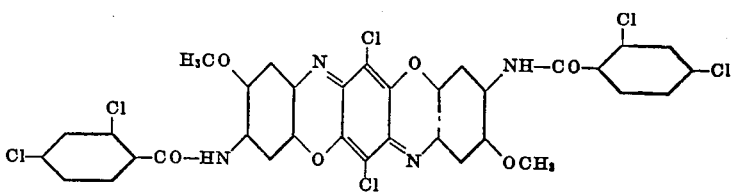

7. The dioxazine pigment of the formula

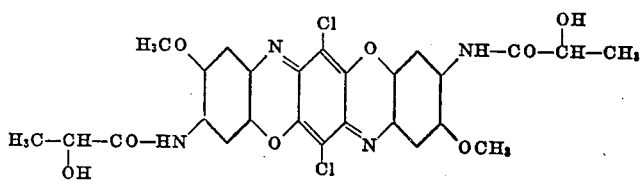

8. The dioxazine pigment of the formula

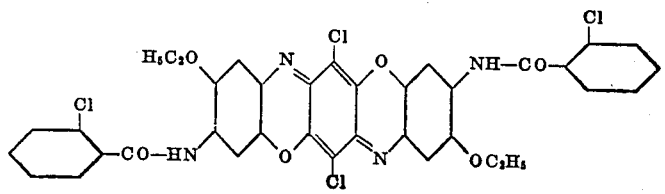

9. A dioxazine pigment of the formula

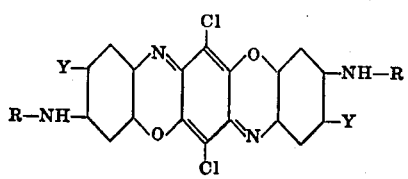

wherein Y is —O-alkyl with a maximum of two carbon atoms, and R is chloro substituted benzoyl with a maximum of two chloro substituents.

References Cited in the file of this patent

Fierz-David et al.: Helv. Chem. Acta, vol. 22, pages 1348–58 (1939).

Venkataraman: Chem. of Synthetic Dyes, vol. 1, page 120 and page 339 (1952).